United States Patent
Catter et al.

(10) Patent No.: US 7,706,252 B2
(45) Date of Patent: Apr. 27, 2010

(54) SYSTEM AND METHOD FOR LOCATING FAULTS IN A HYBRID FIBER COAX (HFC) CABLE NETWORK

(75) Inventors: Bruce L. Catter, Appleton, WI (US); Scott C. Saunders, Oshkosh, WI (US); Ennis McCaffrey, Appleton, WI (US)

(73) Assignee: Time Warner Cable, Inc., New York, NY (US)

(*) Notice: Subject to any disclaimer, the term of this patent is extended or adjusted under 35 U.S.C. 154(b) by 696 days.

(21) Appl. No.: 11/186,215

(22) Filed: Jul. 21, 2005

(65) Prior Publication Data

US 2007/0019557 A1 Jan. 25, 2007

(51) Int. Cl.
*H04N 7/173* (2006.01)
*H04J 3/16* (2006.01)
*G01R 31/08* (2006.01)

(52) U.S. Cl. .................. 370/216; 370/469; 725/108

(58) Field of Classification Search .............. 370/469, 370/352, 216, 241, 218, 220, 341, 344, 419, 370/420, 431, 432; 725/86, 91, 93, 97, 105, 725/106, 108, 111, 113, 114, 115, 116
See application file for complete search history.

(56) References Cited

U.S. PATENT DOCUMENTS

| | | | |
|---|---|---|---|
| 5,432,542 | A | 7/1995 | Thibadeau et al. |
| 5,666,481 | A * | 9/1997 | Lewis ............................ 714/4 |
| 5,884,284 | A | 3/1999 | Peters et al. |
| 5,987,135 | A | 11/1999 | Johnson et al. |
| 6,000,045 | A * | 12/1999 | Lewis ............................ 714/47 |
| 6,272,150 | B1 * | 8/2001 | Hrastar et al. ............... 370/486 |
| 6,393,478 | B1 | 5/2002 | Bahlmann |
| 6,481,011 | B1 | 11/2002 | Lemmons |
| 6,526,582 | B1 | 2/2003 | Brodigan et al. |
| 6,598,057 | B1 | 7/2003 | Synnestvedt et al. |
| 6,704,288 | B1 * | 3/2004 | Dziekan et al. ............. 370/248 |
| 6,769,127 | B1 | 7/2004 | Bonomi et al. |
| 6,898,800 | B2 | 5/2005 | Son et al. |
| 6,947,980 | B1 | 9/2005 | Knudsen et al. |
| 7,111,318 | B2 | 9/2006 | Vitale et al. |
| 7,188,116 | B2 | 3/2007 | Cheng |
| 7,227,889 | B1 | 6/2007 | Roeck et al. |
| 7,251,820 | B1 | 7/2007 | Jost et al. |
| 7,290,046 | B1 | 10/2007 | Kumar |
| 7,313,749 | B2 | 12/2007 | Nerl et al. |
| 7,343,614 | B1 | 3/2008 | Hendricks et al. |
| 2001/0034852 | A1 | 10/2001 | Kawashima |
| 2002/0019983 | A1 | 2/2002 | Emsley et al. |

(Continued)

*Primary Examiner*—Hanh Nguyen
(74) *Attorney, Agent, or Firm*—The Marbury Law Group, PLLC

(57) ABSTRACT

A fault location system (FLS) for a hybrid fiber coax (HFC) cable network. The FLS comprises an interactive map, a datastore, an object generator, and a display server. The datastore receives identifying information and status information of customer premises equipment (CPE) units connected to the HFC cable network. The object generator associates the identifying information and the status of CPE units with an object and further associates graphical attributes with the object. The display server graphically displays the object on the interactive map at location coordinates indicative of the street address, and graphically displays the object according to its graphical attributes. When used with a processor, the FLS applies algorithms to non-responsive CPE units selected from the interactive map to identify possible common sources of a fault.

43 Claims, 9 Drawing Sheets

U.S. PATENT DOCUMENTS

| | | |
|---|---|---|
| 2002/0061012 A1 | 5/2002 | Thi et al. |
| 2002/0109879 A1 | 8/2002 | So |
| 2002/0136165 A1 | 9/2002 | Ady et al. |
| 2002/0143775 A1 | 10/2002 | Wilkinson et al. |
| 2003/0020765 A1* | 1/2003 | Kussmaul et al. ........... 345/853 |
| 2003/0028891 A1 | 2/2003 | Hardt et al. |
| 2003/0036848 A1* | 2/2003 | Sheha et al. ................ 701/209 |
| 2003/0040936 A1 | 2/2003 | Nader et al. |
| 2003/0145075 A1 | 7/2003 | Weaver et al. |
| 2003/0163831 A1 | 8/2003 | Gall et al. |
| 2003/0167319 A1 | 9/2003 | Venkatesulu et al. |
| 2004/0008761 A1 | 1/2004 | Kelliher et al. |
| 2004/0031059 A1* | 2/2004 | Bialk et al. .................. 725/129 |
| 2004/0044554 A1 | 3/2004 | Bull et al. |
| 2004/0054771 A1 | 3/2004 | Roe et al. |
| 2004/0111311 A1 | 6/2004 | Ingman et al. |
| 2004/0120250 A1* | 6/2004 | Langevin et al. ............ 370/216 |
| 2004/0221028 A1* | 11/2004 | Gaddamanugu et al. .... 709/223 |
| 2005/0039213 A1 | 2/2005 | Matarese et al. |
| 2005/0111063 A1 | 5/2005 | Shar et al. |
| 2005/0144641 A1 | 6/2005 | Lewis |
| 2005/0183130 A1 | 8/2005 | Sadja et al. |
| 2005/0204290 A1 | 9/2005 | Eddy et al. |
| 2005/0286466 A1 | 12/2005 | Tagg et al. |

\* cited by examiner

FIGURE 4E

400
CONTINUED FROM FIGURE 4A, 4B, 4C OR 4D

| TICKET | [VALUE] | COMMENTS | [VALUE] |
|---|---|---|---|
| TICKET DATE: | [VALUE] | | |
| DISPATCHER: | [VALUE] | | |
| TECHNICIAN: | [VALUE] | | |
| STATUS: | [VALUE] | | |

450 CREATE TICKET INFORMATION

- CREATE
- SAVE
- SEND E-MAIL

455 ACTION OBJECTS

| CONTROL ICON | TICKET # | STATUS | DATE | HUB | DISPATCHER | TECHNICIAN | COMMENTS |
|---|---|---|---|---|---|---|---|
| ① ② ③ | [VALUE] | [VALUE] | [VALUE] | [VALUE] | [VALUE] | [VALUE] | [VALUE] |

460 ACTIVE TROUBLE TICKETS

| HUB | ACCT # | ADDRESS | CITY | MAC ADDR | NODE | CAS | PS | TA | LE |
|---|---|---|---|---|---|---|---|---|---|
| [VALUE] | [VALUE] | [VALUE] | [VALUE] | [VALUE] | [VALUE] | [VALUE] | [VALUE] | [VALUE] | [VALUE] |

465 NON-RESPONDERS

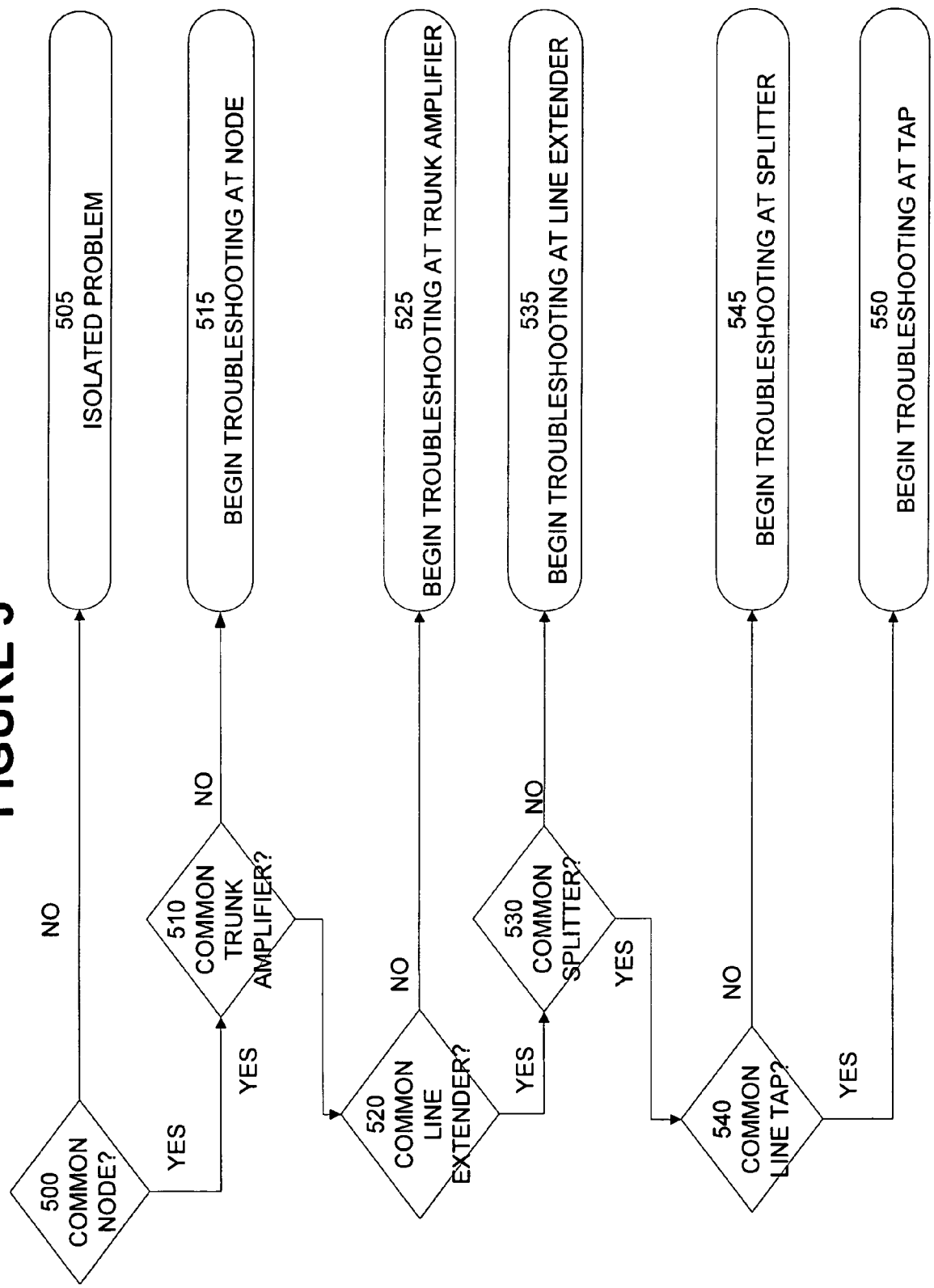

SYSTEM AND METHOD FOR LOCATING FAULTS IN A HYBRID FIBER COAX (HFC) CABLE NETWORK

BACKGROUND

Embodiments of the present invention are directed generally to cable network fault location and more specifically to a system and method for displaying the location of non-responding set top boxes (STBs) and cable modems (CMs) graphically, relative to the location of cable network components.

Cable networks deliver voice, data, and video to subscribers over a complex network of headends, regional data centers, hubs, and nodes. At the upstream terminus of the network is the headend and regional data center. Typically, a head end comprises the analog and digital video signal processors, video on demand systems, and other video content management devices. A regional data center comprises digital service management devices (e-mail servers, DNS, and Internet connectivity) and routers that interconnect the regional data center with a headend. A hub receives the video and data signals from the headend and regional data center, processes these signals through appropriate modulators, and sends these signals downstream to a hub. The hub provides the signals to a node that is ultimately associated with individual subscribers. A node provides an interface between the fiber-based component of the HFC cable network and the RF/cable component of the network that is the transport media to the home.

In a commercial network, a headend may service multiple hubs and a hub may service multiple nodes. A regional data center may provide digital services to multiple headends. From a node to the home, the RF/cable component of the HFC cable network may branch numerous times. Amplifiers, line extenders, and passive devices are employed to maintain signal quality across all branches (or "cascades") serviced by the node.

FIG. 1 illustrates typical prior art cable system architecture. A headend 100 comprises a network control system 102 that handles set-top provisioning, system management and interactive session set-up, a video signal processor 104 that handles content acquisition and delivery, 256 QAM Modulators 111 that generate modulated RF streams of digital video signals, a high speed data interface 106, and a billing system 107.

Headend 100 communicates with hub 108. Hub 108 comprises a cable modem termination system 110, a 256 QAM modulator 112 for downstream data traffic, a QPSK modulator for downstream Out-of-Band Data traffic 114, and a QPSK demodulator 116 for upstream Out-of-Band Data traffic. As will be appreciated by those skilled in the art, a hub may comprise multiple instances of each device illustrated in FIG. 1.

Hub 108 communicates with nodes 120A, 120B and 120C. Nodes 120 provide an interface between the fiber-based transport medium of the cable network (between the headend 100 and upstream side of nodes 120) and the coax-based medium (between the downstream side of nodes 120 and the taps 145). The downstream side of node 120B is further illustrated as connecting to trunk amplifier 1 125 which in turn is connected to trunk amplifier 2 130. The serial path from node 120B through trunk amplifier 1 125 to trunk amplifier 2 130 is referred to as a cascade relative to node 120B. Trunk amplifier 1 125 has three branches that are cascades relative to trunk amplifier 1 125 and sub-cascades relative to node 120B.

As will be appreciated by those skilled in the art, FIG. 1 is a greatly simplified schematic of cable network architecture. A hub typically serves 20,000 subscribers. A typical hub supports from 50 to 100 nodes with each node capable of serving 250 to 2000 subscribers. In order to maintain signal quality and quality of service commitments, trunk amplifiers maintain high signal quality. Internal trunk modules in the trunk amplifiers boost signals for delivery to subscribers' homes. Line Extender amplifiers maintain the high signal levels in cascades after the trunk amplifiers, through the neighborhoods. Taps divide out small amounts of signal for connection to the homes. Nominal cascade limits are up to 4 trunk amplifiers followed by up to 3 line extenders, with more in very rural areas. In suburban areas, cascades typically comprise 2 trunk and 2 line extenders. Because branching is unlimited, the total device count per node may be large despite short cascades.

At the downstream end of the network is the customer premises equipment (CPE). Referring again to FIG. 1, tap 145 connects a set top box (STB) 150 and a cable modem (CM) 155 to the HFC cable network via drop 147. The CPE receives content from a headend or regional data center and provides access to it by a subscriber. For example, video programming is delivered to STB 150 and high speed data services are delivered to CM 155.

The complexity of cable networks makes network fault isolation and maintenance a challenging task. The task can be partitioned into four stages:
- determining that a failure has occurred or is imminent;
- determining what has failed;
- determining where in the network the failure is likely to be; and
- determining what equipment is required to remedy, or prevent, the failure.

A failure in any of the system components that provide services will ultimately cause subscribers to complain. However, relying on subscriber complaints to identify network faults is not only bad for business but, in many situations, too imprecise to be helpful. Further, customer complaints represent the existence of a problem rather than forecast that a problem is developing. Reliance on such data alone for network fault isolation and maintenance precludes proactive responses by the cable operator.

Structural and procedural concepts for isolating and correcting faults in network components and CPE have been disclosed in U.S. patent application Ser. No. 11/040,391, filed Jan. 21, 2005, for "A Fault Isolation System And Method;" in U.S. patent application Ser. No. 11/069,155, filed Mar. 1, 2005, for "An Early Warning Fault Identification And Isolation System For A Two-Way Cable Network;" in U.S. patent application Ser. No. 11/069,156, filed Mar. 1, 2005, for "A Fault Detection And Isolation System For An HFC Cable Network And Method Therefor;" and U.S. patent application Ser. No. 11/069,080 filed Mar. 1, 2005 for "A System And Method For Identifying And Isolating Faults In A Video On Demand Provisioning System." The Ser. No. 11/040,391, the Ser. No. 11/069,155, the Ser. No. 11/069,156 and the Ser. No. 11/069,080 applications are incorporated herein in their entirety for all purposes.

Having determined that a problem in an HFC cable network has occurred, it is important to provide information to those responsible for taking remedial action as to the location of the fault and its possible causes. In particular, when field personnel are dispatched to correct problems affecting CPE, it would be very useful to understand the location of network components (hardware and transmission media) relative to the affected CPE. Typically, location information is provided in the form of printed address lists or maps.

What would be useful would be an interactive, computer-based fault management tool comprising an interactive map having data layers reflective of the street location of CPE relative to components of the physical plant (fiber, coax, and network devices). Such a fault management tool would display information relating to the state of a CPE unit and the state of a component of the physical plant. Additionally, the fault management tool would apply algorithms to fault data to identify possible common sources of a fault.

SUMMARY

According to an embodiment of the present invention, a computer-based fault location system (FLS) comprises an interactive map having data layers reflective of the street location of a CPE unit relative to components of the physical plant (fiber, coax, and network devices) and other data layers of geographic or administrative boundary significance (lot lines, zoning, township lines and the like). In an embodiment of the present invention, the FLS is a portable computing device that is wirelessly connected to a data network. The FLS has access via the network to a datastore comprising identifying information of the CPE unit and status information of the CPE unit.

In an exemplary embodiment, the CPE unit is a video termination device (VTD). In an embodiment of the present invention, a VTD comprises a standalone set top box (STB). However this is not meant as a limitation. For example, a VTD performing the communication functions of an STB may be incorporated into a cable-ready television with the security and access functions performed by an external PCMCIA type card. See, OpenCable™ Multistream CableCARD Interface Specification OC-SP-MC-IF-I02-040831 and OpenCable™ Applications Platform (OCAP) Specification OC-SP-OCAP1.0-I15-050415.

According to an embodiment of the present invention, CPE identifying information comprises a street address of the subscriber associated with the CPE unit, a CPE MAC address, a CPE serial number, a CPE part number, a CPE release number, a CPE manufacturer identifier, and a subscriber number. According to an embodiment of the present invention, the CPE status information comprises a "responding" state indicative of CPE units for which an upstream signal has been detected at a headend or other point in the network, a non-responder state indicative of CPE units for which an upstream signal has not been detected at a headend, and an upstream signal power level setting.

The FLS further comprises an object generator that associates the CPE identifying information and the CPE status information with a display object. In an embodiment of the present invention, the object generator further associates graphical attributes with the display object based on the identifying information and/or status information associated with the display object.

The FLS further comprises a display server that displays objects on the interactive map at location coordinates indicative of the street address associated with CPE unit and graphically displays objects according to an object's graphical attributes.

In an embodiment of the present invention, the FLS further comprises a processor that applies algorithms to non-responsive CPE units selected from the interactive map to identify possible common sources of a fault.

It is an aspect of the present invention to provide a graphical representation of a hybrid fiber coax (HFC) cable network that associates and identifies non-responsive CPE units to the network architecture.

It is another aspect of the present invention to provide a portable fault location system (FLS) comprising an interactive map that displays a graphical representation of the HFC cable network and associates and identifies non-responsive CPE units to the network architecture.

It is yet another aspect of the present invention to use the FLS to create maintenance tickets for selected non-responsive CPE units.

It is still another aspect of the present invention to attend to non-responsive CPE units prior to receipt of a subscriber complaint.

It is an aspect of the present invention to increase the efficiency of maintenance field personnel and to reduce demand on maintenance resources.

It is yet another aspect of the present invention to present other geographic factors to a technician that may affect the technician's ability to service the network.

It is still another aspect of the present invention to present information of an administrative nature, such as property lines, zoning and the like that may affect the ability of the technician to service the network.

These and other aspects of the present invention will become apparent from a review of the description that follows.

It will be appreciated by those skilled in the art that detection of non-responders on an HFC cable network need not necessarily be accomplished at the headend. The overall object of the present invention is to detect a non-responder and take corrective action in an efficient and effective manner. Wherever a non-responder can be detected is deemed to be within the scope of the present invention. Thus the present invention, as more fully set forth below comprises a system and method of locating a fault in an HFC cable network. The HFC cable network of the present invention comprises a plurality of addressable CPE units performing the functions of a set top box and/or a cable modem, some of which may be incorporated in, without limitation, video termination devices, digital video recorders, televisions, computers and other devices.

An embodiment of the present invention provides a method of locating a fault in an HFC cable network comprising a plurality of addressable customer premises equipment (CPE) units. By way of illustration and not as a limitation, a CPE unit may be a video termination device (VTD), a cable modem, or a media terminal adapter (MTA). The VTD may be a set top box, an OpenCable-compliant standalone device, and a consumer device integrated with an OpenCable-compliant device.

According to an embodiment of the present invention, identifying information of a CPE unit is obtained. By way of illustration and not as a limitation, identifying information comprises a street address of a subscriber associated with the CPE unit. According to an embodiment of the present invention, identifying information further comprises one or more data elements selected from the group consisting of a CPE MAC address, a CPE serial number, a CPE part number, a CPE release number, a CPE manufacturer identifier, and a subscriber number.

The identifying information and graphical attributes are associated with an object. The object is displayed at location coordinates indicative of the street address on an interactive map as determined from the identifying information. The interactive map displays a geographic area comprising the HFC cable network and provides tools for selecting a local geographic area comprising a portion of the HFC cable network, for displaying locations of subscribers of the HFC cable network, for displaying locations of plant components of the HFC cable network, for distinguishing non-responding CPE units from other CPE units associated with subscribers, for displaying objects associated with CPE units, for providing directions to subscriber locations, and for providing notes peculiar to the subscriber locations.

A determination is made that an upstream signal from the CPE unit cannot be detected. According to an embodiment of the present invention, the determination is made before a subscriber complaint is received from a subscriber associated with the non-responding CPE unit. A CPE unit for which an upstream signal cannot be detected is identified as a "non-responding" CPE unit. In yet another embodiment of the present invention, determining that an upstream signal from a CPE unit cannot be detected is performed at a headend of the HFC cable network. A non-responder attribute may be assigned to an object associated with a non-responding CPE unit. By way of illustration and not as a limitation, a non-responder attribute comprises a color, a shape, a blinking graphic, and an audible warning Using the location of an object associated with the non-responding CPE unit relative to other objects associated with other CPE units and objects associated with other non-responding CPE units a likely cause of the non-responsiveness of the non-responsive CPE unit is determined. Remedial action is taken to correct the likely cause.

According to another embodiment of the present invention, the method further comprises using a shaped or freehand selection tool to select a group of CPE units from the interactive map, wherein a CPE unit within the group is referred to as a group selection member. Group selection members may be selected for exclusion from the group using a shaped selection tool or a freehand selection tool. In another embodiment of the present invention, the identifying information of the selected CPE units is displayed.

In still another embodiment of the present invention, the selected CPE units are assigned to a trouble ticket. A trouble ticket attribute may be assigned to an object associated with a CPE unit assigned to a trouble ticket. By way of illustration and not as a limitation, the trouble ticket attribute comprises a color, a shape, a blinking graphic, and an audible warning. According to another embodiment of the present invention, a determination is made whether a selected CPE unit is assigned to a current trouble ticket. If the selected CPE unit is not assigned to a current trouble ticket, then the CPE unit is assigned to a new trouble ticket.

According to yet another embodiment of the present invention, a list of trouble tickets is displayed. A trouble ticket is selected from the list and the non-responsive CPE units associated with the selected trouble ticket are displayed on the interactive map.

In an embodiment of the present invention, the method further comprises associating the identifying information of a CPE unit with a trouble history of the CPE. A likely cause of the non-responsiveness of the non-responsive CPE unit is determined from the location of the object relative to other objects associated with other CPE units, from objects associated with other non-responding CPE units, and from the trouble history of the object and other objects.

In yet another embodiment of the present invention, layers are selectively displayed on the interactive map. By way of illustration and not as a limitation, a design layer, a strand layer and a fiber layer are selectively displayed. A measurement tool may be used to determine a distance between an object on a layer and a location.

Embodiments of the present invention further describe systems to perform the various methods. A hybrid fiber coax (HFC) cable network comprises a plurality of CPE units. A fault location system comprises an interactive map, a datastore, an object generator, a display server, and a fault isolation server. The datastore receives identifying information of a CPE unit. The identifying information comprises a street address of a subscriber associated with the CPE unit. The datastore also receives status information of the CPE unit, wherein the status information comprises a "responding" state indicative of a CPE unit for which an upstream signal has been detected and a non-responder state indicative of a CPE unit for which an upstream signal has not been detected.

The object generator associates the identifying information and the status of the CPE unit with an object and associates graphical attributes with the object.

The display server graphically displays the object on the interactive map at location coordinates indicative of the street address according to its graphical attributes.

The fault isolation server associates the identifying information of the CPE unit with a trouble history of the CPE unit and determines from the location of the object relative to other objects associated with other CPE units, from objects associated with other non-responding CPE units, and from the trouble history of the object and other objects a likely cause of the non-responsiveness of the non-responsive CPE unit.

The process of the present invention for isolating problems with a specific CPE unit involves determining that an upstream signal from the CPE unit cannot be detected, wherein the CPE unit is identified as "non-responding." It should be noted that while this signal detection may occur at the headend, this is not meant as a limitation. The present invention deals with the process of detecting (or not detecting) a signal. Where that detection takes place is a matter of design. Once the determination is made that a CPE unit is a "non-responder" the system of the present invention isolates the object associated with that CPE unit, relates its location to other objects associated with other CPE units as reflected in a datastore, assigns a likely cause of the non-responsiveness of the non-responsive CPE unit, and displays that information for a field technician so that remedial action to correct the likely cause can be taken.

Part of the present invention is an interactive map that is displayed to the field technician. Using the interactive map, the field technician can see a graphical representation of the location of the non-responder. Non-responding CPE units on the HFC cable network can be depicted as a color and, as a shape, can flash and may provide some form of audible warning to the field technician in particular cases. Other graphical attributes known in the art may also be used to highlight or otherwise draw the filed technician's attention to the device(s) in question.

DESCRIPTION OF THE DRAWINGS

FIGS. 4A, 4B, 4C, 4D and 4E illustrate the elements of an interactive display according to an embodiment of the present invention.

FIG. 5 illustrates a block diagram of a process for identifying common faults among selected non-responding subscriber locations according to an embodiment of the present invention.

DETAILED DESCRIPTION

Figure 1:
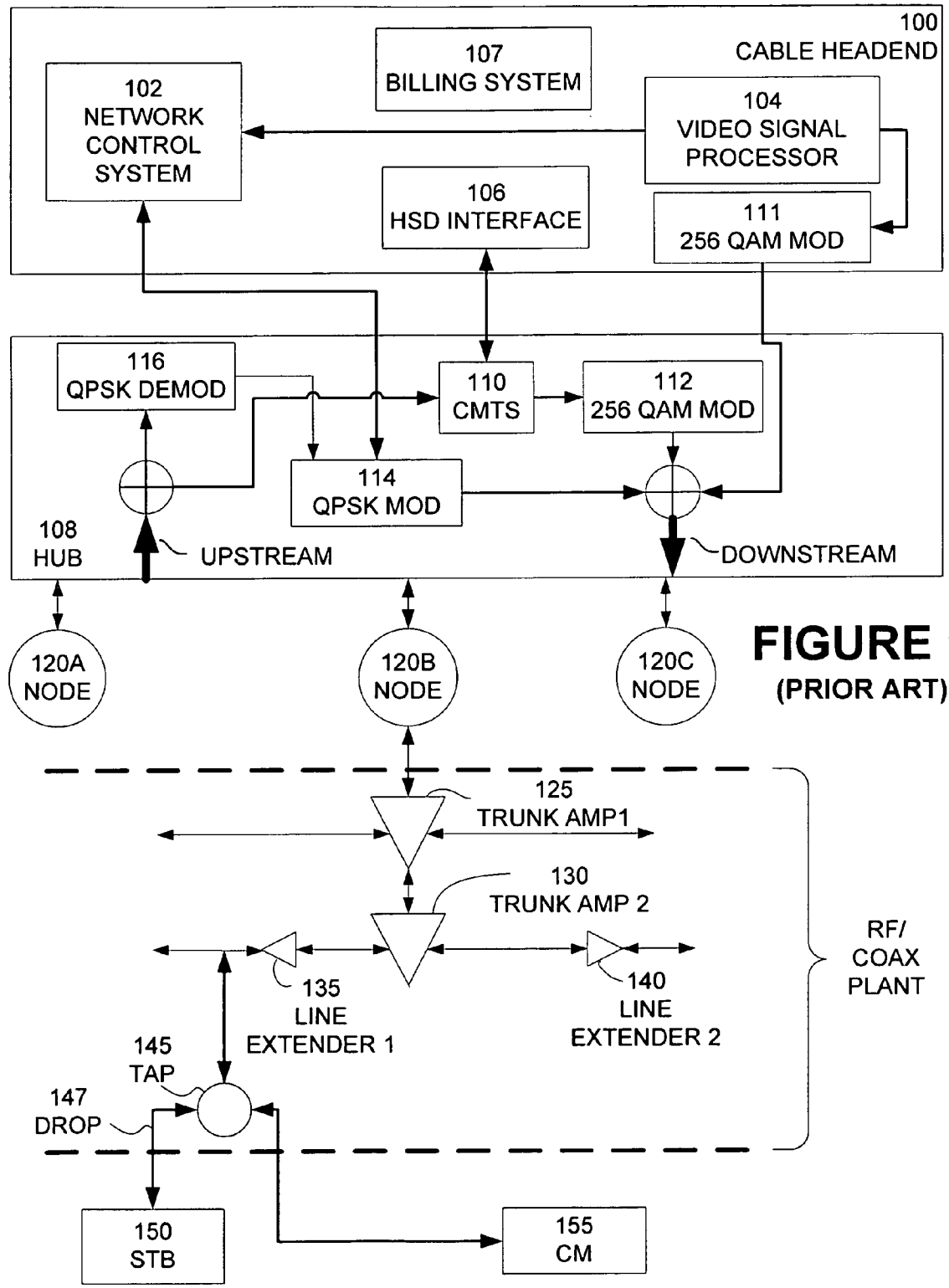
FIG. 1 illustrates typical prior art cable system architecture.

The following terms are used in the description that follows. The definitions are provided for clarity of understanding:

Trunk Amplifier—Trunk amplifiers amplify and reamplify cable signals for transmission through a cable television trunk system and out to the distribution system. They provide the interface between the trunk and distribution systems. Also called a trunk or a trunk/amplifier.

Cascade—A serial path extending from an active device.

CM—Cable modem.

CPE—Customer premises equipment.

GIS—Geographic Information System. A GIS displays geographic and administrative areas and boundaries in a graphical form.

HFC—Hybrid Fiber Coax. A network design that employs both fiber optic and coaxial cables to deliver cable video and data services.

Hub—The local source of cable services. By way of illustration and not as a limitation, a hub may serve 20,000 subscribers.

IP address—IP address as used herein means a uniquely addressable identifier associated with network or home equipment capable of responding to a ping.

Line extender—An amplifier that reamplifies the signal from the Trunk amplifier. Taps that provide the cable connections to the homes are installed in the distribution cabling between the Trunk amplifiers and the line extenders.

Node—A device that provides an interface between the fiber optic and coaxial cable systems of an HFC cable system. Light from a fiber optic cable is converted into an electrical signal suitable for delivery in a coaxial cable system within this device.

PING—The verb "to PING" means the act of using the ping utility or command. The ping utility sends a packet to a device with an IP address and waits for a response. The response is indicative that the ping packet was received by the device and the device is present on the network. The noun "ping" means the request for a response from a network device.

Poll—The verb "poll" means the act of using a utility or command by one network device to request data from another network device.

RDC level—Reverse data carrier level. A measure of the signal strength of the upstream signal generated by an STB or other CPE device.

STB—Set top box.

Tap—A passive device that divides out small amounts of signal for connection to the homes. They typically have 2, 4 or 8 ports for connection of drop cables.

VTD—Video termination device.

Cable networks have evolved from downstream broadcast systems provided over coax cable to hybrid fiber cable (HFC) networks capable of both downstream and upstream communications using both analog and digital signals. With respect to video services, a CPE unit comprises a VTD adapted to send upstream signals to a designated location to request video on demand (VOD) services pay per view (PPV) services, and switched video broadcast (SVB) services and to issue control commands (play, stop, fast forward, rewind, and pause) that affect the video stream. Two-way VTDs are addressable, can be associated with a subscriber and a physical location within an HFC cable network using VTD identifying information.

In another embodiment of the present invention, a CPE unit comprises a cable modem (CM) that is adapted for two-way communication. A CM can be associated with a subscriber and a physical location within an HFC cable network using CM identifying information.

Additionally, both CMs and VTDs have status information that can be obtained and analyzed. By way of illustration and not as a limitation, a network device may be "PINGED" to determine whether the device is able to communicate with the network. As used herein, the verb "PING" means the act of using the ping utility or command. The PING utility sends a packet to a device with an IP address. As used herein, an IP address means a uniquely addressable identifier associated with network or home equipment capable of responding to a PING. The PING utility waits for a response. The response is indicative that the device received the PING-packet, that the device is present on the network, and that the path to the device is functional. A device that does not respond to the PING may be non-responsive because the device is not connected to the HFC cable network, because the device is not functioning properly, because that device is not currently registered with the HFC cable network, or because some aspect of the HFC cable network is not functioning properly. As will be appreciated by those skilled in the art, other utilities may be used to confirm that a device on the HFC cable network is capable of receiving data in the downstream direction and sending data in the upstream direction without departing from the scope of the present invention.

Because CMs and VTDs may use different network devices to establish a communication path with a central network location, the status of these devices may be analyzed to determine a likely cause of a network fault.

In yet another embodiment of the present invention, VTDs are polled. The verb "poll" means the act of using a utility or command by one network device to request data from another network device. In this embodiment, a VTD is polled for its current reverse data carrier (RDC) level. High RDC levels are indicative of noise on the upstream and/or problems with equipment that support the upstream of the HFC cable network.

Figure 2:
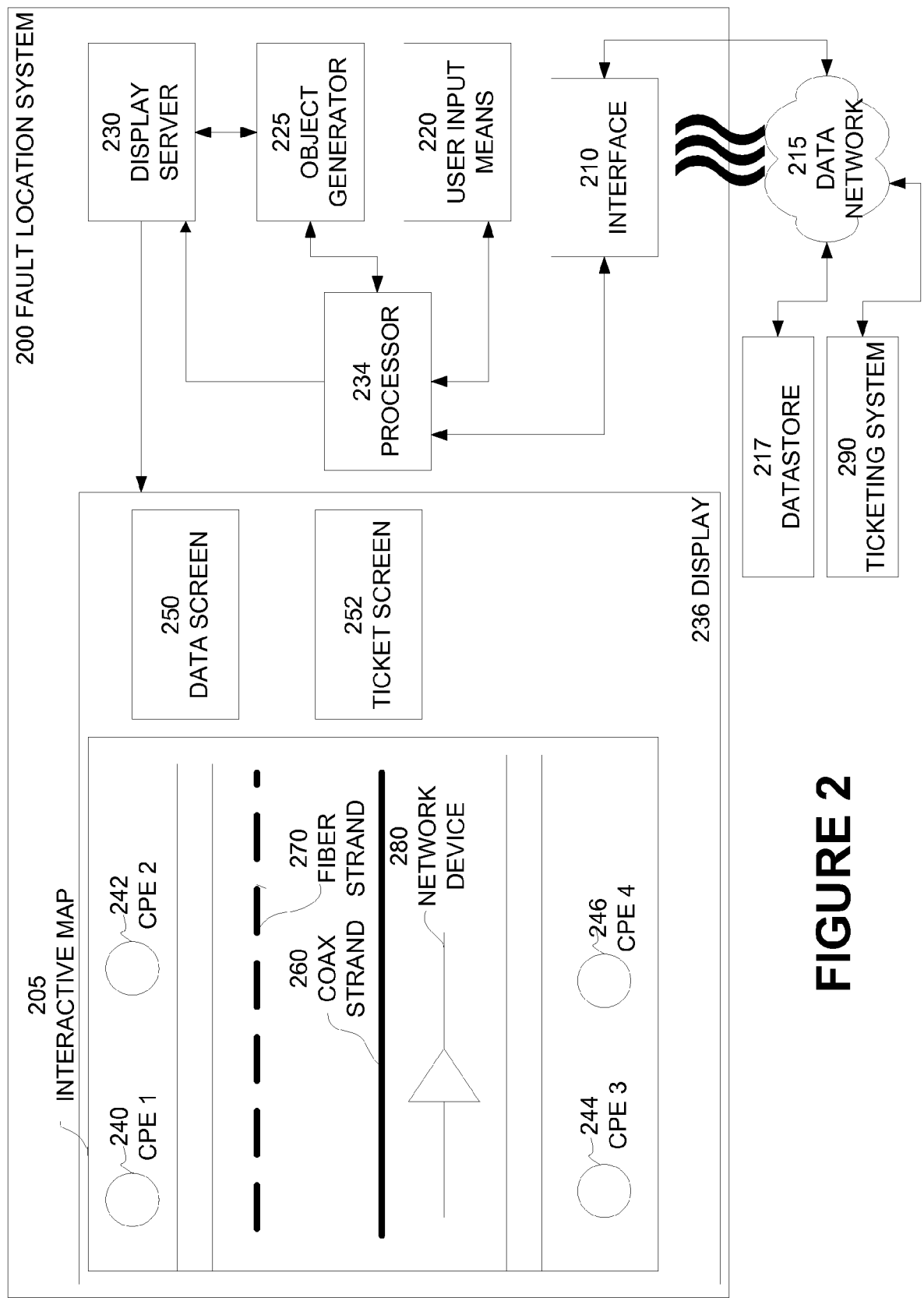
FIG. 2 illustrates a fault location system according to an embodiment of the present invention.

FIG. 2 illustrates a fault location system according to an embodiment of the present invention.

Referring to FIG. 2, a computer-based fault location system (FLS) 200 comprises a display 236 displaying objects on an interactive map 205. The objects are associated with data reflective of a street location of CPE objects relative to component objects representing the physical plant (fiber, coax, and network devices) of the HFC cable network. For the sake of clarity, FIG. 2 illustrates a single layer comprising a street, CPE 1-4 (240, 242, 244, and 246), a coax strand 260, a fiber strand 270, and a network device 280. However, this is not meant as a limitation. As will be appreciated by those skilled in the art, the CPE and physical plant components may be incorporated in separate layers and either displayed individually or as a composite image (as illustrated in FIG. 2) without departing from the scope of the present invention.

Figure 3:
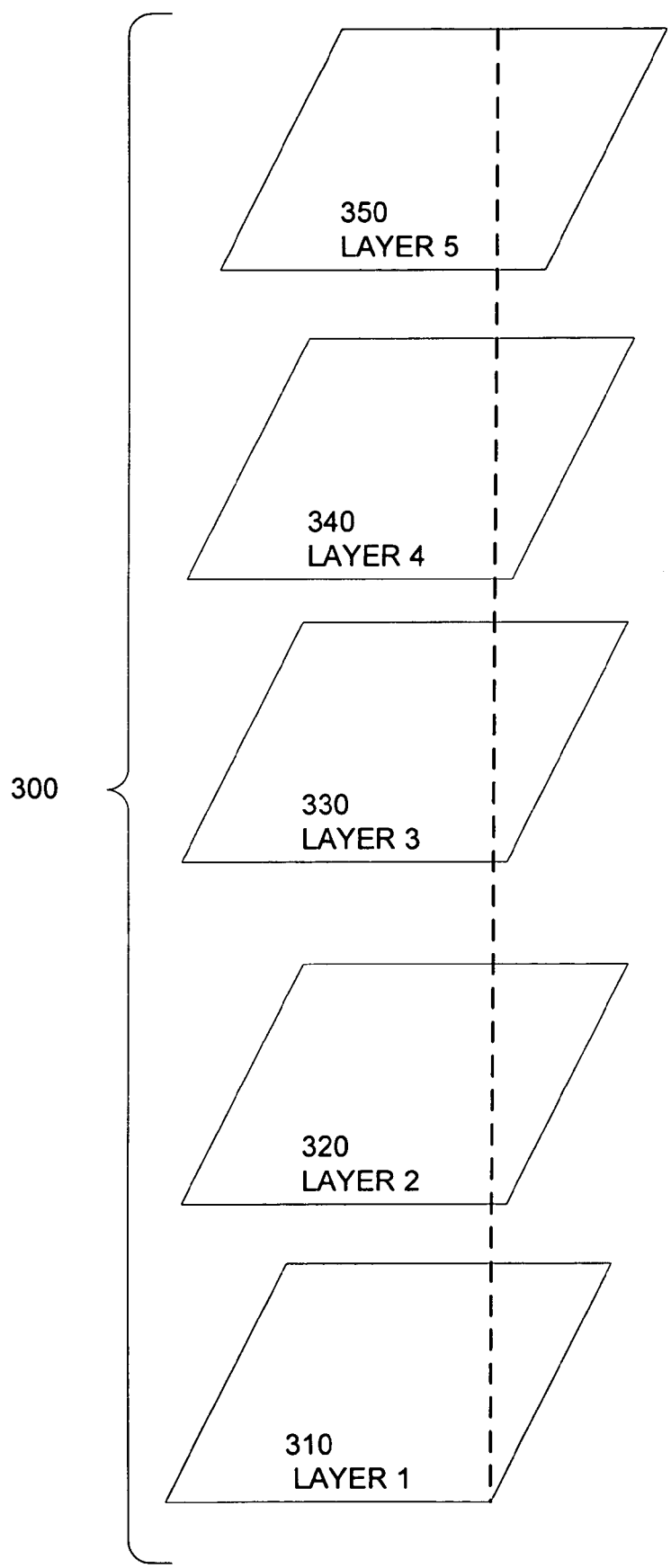
FIG. 3 illustrates interactive digital map layers according to an embodiment of the present invention.

FIG. 3 illustrates interactive digital map layers according to an embodiment of the present invention. Referring to FIG. 3, layer 1 310 comprises an interactive digital map layer. According to an embodiment of the present invention, layer 1 310 comprises a scalable geographic projection of a location that comprises street-level data. The scale, and hence the level of detail, of layer 1 310 is user selectable.

In an embodiment of the present invention, layer 2 320 comprises an overlay of cable subscriber locations. Layer 3 330 comprises an overlay of an HFC network coax strand that is scaled and oriented relative to the scale of layer 1 310. Layer 4 340 comprises an overlay of an HFC network fiber strand that is scaled and oriented relative to the scale and orientation of layer 1 310. Layer 5 350 comprises an overlay of network devices that are components of the cable strand or the fiber strand. Layer 5 is scaled and oriented relative to the scale and orientation of layer 2 330 and layer 4 340 as appropriate. According to an embodiment of the present invention, a layer may be displayed independently of, or simultaneously with, any other layer.

According to another embodiment of the present invention, selection tools interact with the highest level currently displayed on display 236 (see, FIG. 2).

As will be appreciated by those skilled in the art, additional layers may be defined and displayed without departing from the scope of the present invention. By way of illustration, in an embodiment of the present invention, a layer displays cable modems, another layer displays VTDs and yet another layer displays MTAs providing digital telephone service. Layers may also be defined for repeat non-responders.

According to an embodiment of the present invention, a layer (not illustrated) displays responding subscriber locations. Responding subscriber locations may be used to eliminate a network component as a cause of a problem with a subscriber CPE unit.

Referring again to FIG. 2, according to an embodiment of the present invention, the FLS 200 is a portable computing device that is connected to a data network 215 through a network interface 210. Network interface 210 supports both wired and wireless network interconnections.

The FLS has access via data network 215 to a datastore 217 comprising identifying information of CPE units and status information of CPE units. According to an embodiment of the present invention, CPE identifying information comprises a street address of the subscriber associated with the CPE, a CPE MAC address, a CPE serial number, a CPE part number, a CPE release number, a CPE manufacturer identifier, and a subscriber number. According to an embodiment of the present invention, the CPE status information comprises a "responding" state indicative of CPE units for which an upstream signal has been detected at a central network location, a non-responder state indicative of CPE units for which an upstream signal has not been detected at a central network location, and an upstream signal power level setting.

The FLS further comprises an object generator 225 that associates the CPE identifying information and the CPE status information with a display object. In an embodiment of the present invention, the object generator 225 further associates graphical attributes with the display object based on the identifying information and/or status information associated with the display object.

The FLS further comprises a display server 230 that displays objects and text on display 236. In an embodiment of the present invention, objects are displayed on the interactive map 205 at location coordinates indicative of the street address associated with a CPE unit. An object is graphically displayed according to the object's graphical attributes.

In an embodiment of the present invention, the FLS further comprises a processor 234 that executes instructions as required by the object generator 225 and the display server 230. In another embodiment of the present invention, the processor 234 applies algorithms to status information of non-responding CPE units selected from the interactive map to identify possible common sources of a fault.

A user input means 220 sends commands to processor 234 to permit a user to interact with interactive map 205, to select information to be displayed by display server 230, and to interact with the ticketing system 290. In an embodiment of the present invention, user input means allows a user of the fault location system 200 to navigate interactive map 205, to select scaled views of an area covered by the interactive map 205, and to select layers to be imposed on the geographic area selected. In another embodiment of the present invention, user input means 220 allows a user of fault location system 200 to select display objects representing CPE and network components and to obtain identifying and status information about the display objects selected.

In yet another embodiment, the FLS further comprises elements of a geographic information system (GIS) that allows a field technician to display geographic information associated with the CPE in question. For example and without limitation, the GIS element displays forested, marsh, or other naturally occurring obstacles that may exist in the network associated with the CPE. In tracing the buried cable associated with the CPE, the technician would then know if any such obstacle is to be encountered and can act accordingly.

Similar to physical features, other "administrative" features may be present in a GIS. For example and without limitation, a cable that crosses county or city boundaries may imply different regulations associated with maintenance work. The GIS associated with the FLS can also depict those "objects" and thereby notify the technician of the presence of these administrative features.

Ticketing system 290 generates a trouble ticket in response to a user input. In an embodiment of the present invention, the fault location system 200 interacts with the ticketing system 290 by conveying identifying information of CPE selected by a user via interactive map 205. In this embodiment of the present invention, the ticketing system issues a trouble ticket for the CPE selected by the user of the fault location system 200.

In addition to interactive map 205, display 236 displays data screen 250 and ticket screen 252. Data screen 250 provides identifying and status information for selected CPE. In an embodiment of the present invention, data screen 250 can be used to select a CPE unit and to display that CPE unit on interactive map 236.

Ticket screen 252 provides trouble ticket information associated with selected CPE units. In an embodiment of the present invention, a trouble ticket may be selected from ticket screen 252 and the CPE units associated with that trouble ticket displayed on interactive map 236.

As previously noted, object generator 225 associates graphical attributes with the display object based on the identifying information and/or status information associated with the display object. By way of illustration and not as a limitation, a graphical attribute may be a display color, a display intensity, an object shape, and a display modulation, such as blinking or motion. When applied to a display object, the graphical attribute may convey information about the object such as its status, it its inclusion in a trouble ticket, and its priority for remedial action.

In another embodiment of the present invention, the processor 234 applies fault algorithms to status information of non-responding CPE units selected from the interactive map to identify possible common sources of a fault. By way of illustration and not as a limitation, a fault algorithm may be applied to the status information to determine the nearest common network device of selected CPE units. Because in some configurations CMs and VTDs use different network devices to establish two-way connectivity with the head end, a fault algorithm may be applied to the status information of responding CPE near the selected non-responding CPE to determine likely causes of a fault. In this way, field personnel may be directed to the source of a fault more quickly and efficiently.

FIGS. 4A, 4B, 4C, 4D and 4E illustrate the elements of an interactive display according to an embodiment of the present invention.

Figure 4A:
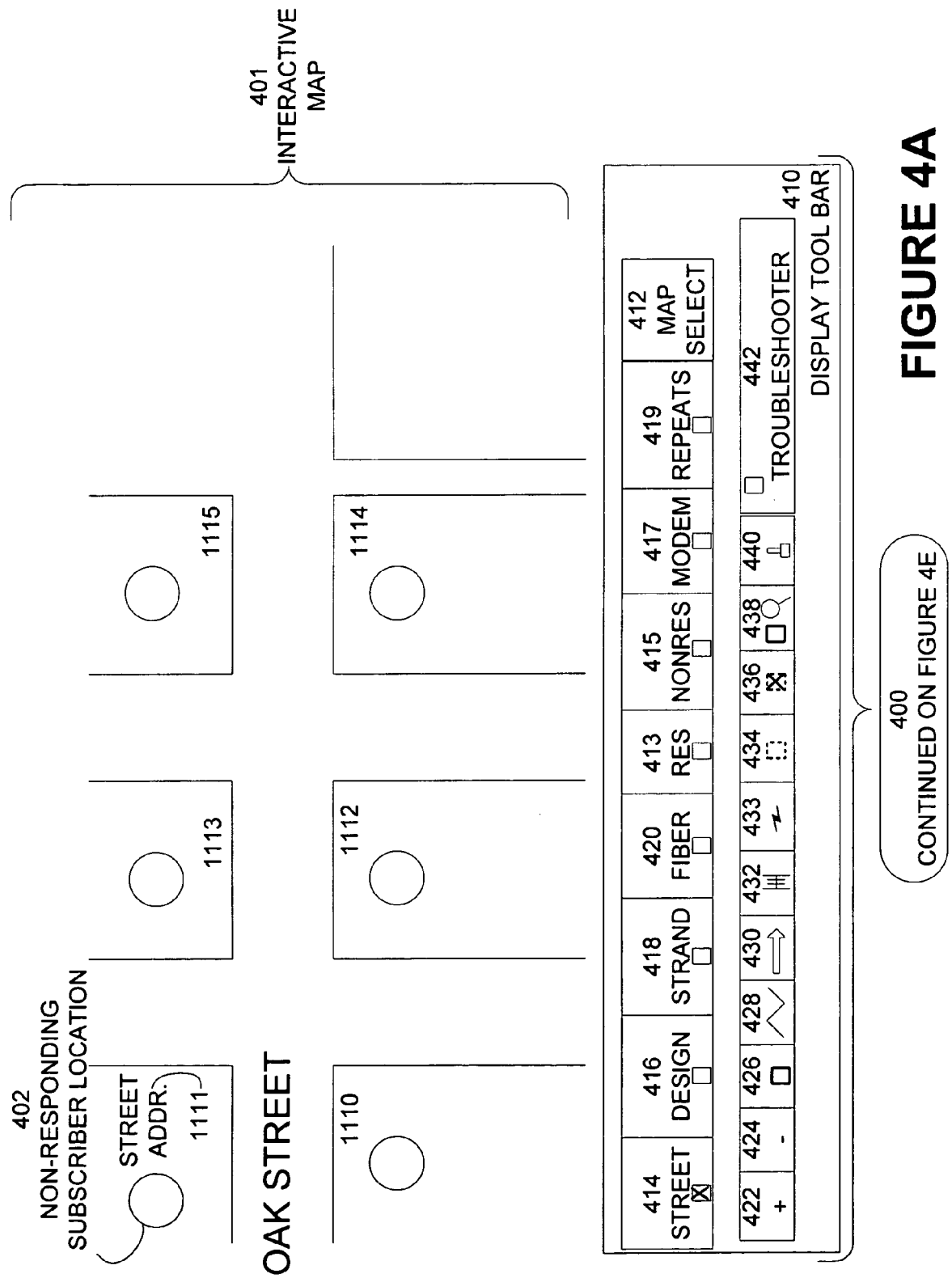

Referring to FIGS. 4A and 4E, an interactive display 400 comprises an interactive map 401, a display toolbar 410, a create ticket information block 450, an action block 455, an active trouble tickets block 460, and a non-responders block 465.

Referring to FIG. 4A, interactive map 401 is responsive to display toolbar 410. The map 401 that is displayed is selected from map-select pull down menu 412. In an embodiment of the present invention, map-select pull down menu 412 presents a list of maps sorted by hub and by central network location. Screen elements are associated with layers (see, FIG. 3) that may be displayed independently or as overlays to create views.

The "street maps" layer view 414 displays the streets and their associated names.

The "design" layer 416 view displays the electronic components of the HFC cable network.

The "strand" layer 418 view displays the cable and strand routes, poles, and pedestals.

The "fiber" layer 420 view displays the routing of the optical fiber of the HFC cable network.

The "responder" layer view 413 displays responding subscriber locations.

The "non-responder" layer view 415 displays non-responding subscriber locations.

The "modem" layer view 417 displays responder subscriber locations reporting problems with a cable modem.

The repeats layer view 419 displays non-responding subscriber locations that were previously identified as non-responding subscriber locations within a specified time-frame. According to an embodiment of the present invention, the repeats layer view 419 works in conjunction with the non-responder layer view 415 and the modem layer view 417 to display only the repeat problem subscriber locations.

According to an exemplary embodiment of the present invention, all layers display non-responding subscriber locations relative to a street map of a selected location. The street layer view 414 adds street names and subscriber addresses. Additional layers add additional information regarding the coax and fiber strands of the network and the RF and optic devices that provide connectivity.

While a particular set of views is illustrated in FIGS. 4A-4D, this is not meant as a limitation. As will be appreciated by those skilled in the art, any number of elements may be assigned to unique layers and displayed independently or as an overlay without departing from the scope of the present invention.

As illustrated in FIG. 4A, only the street layer view 414 has been selected. Non-responding subscriber location 402 is displayed relative to the street location. The street name and street address of each non-responding subscriber's location is also displayed. According to an exemplary embodiment, the CPE unit is a video termination device (VTD) and is deemed "responding" if the VTD can receive a signal in the downstream direction and provide a response in the upstream direction. A non-responding VTD is incapable of receiving a downstream signal, responding with an upstream response, or both.

Figure 4B:
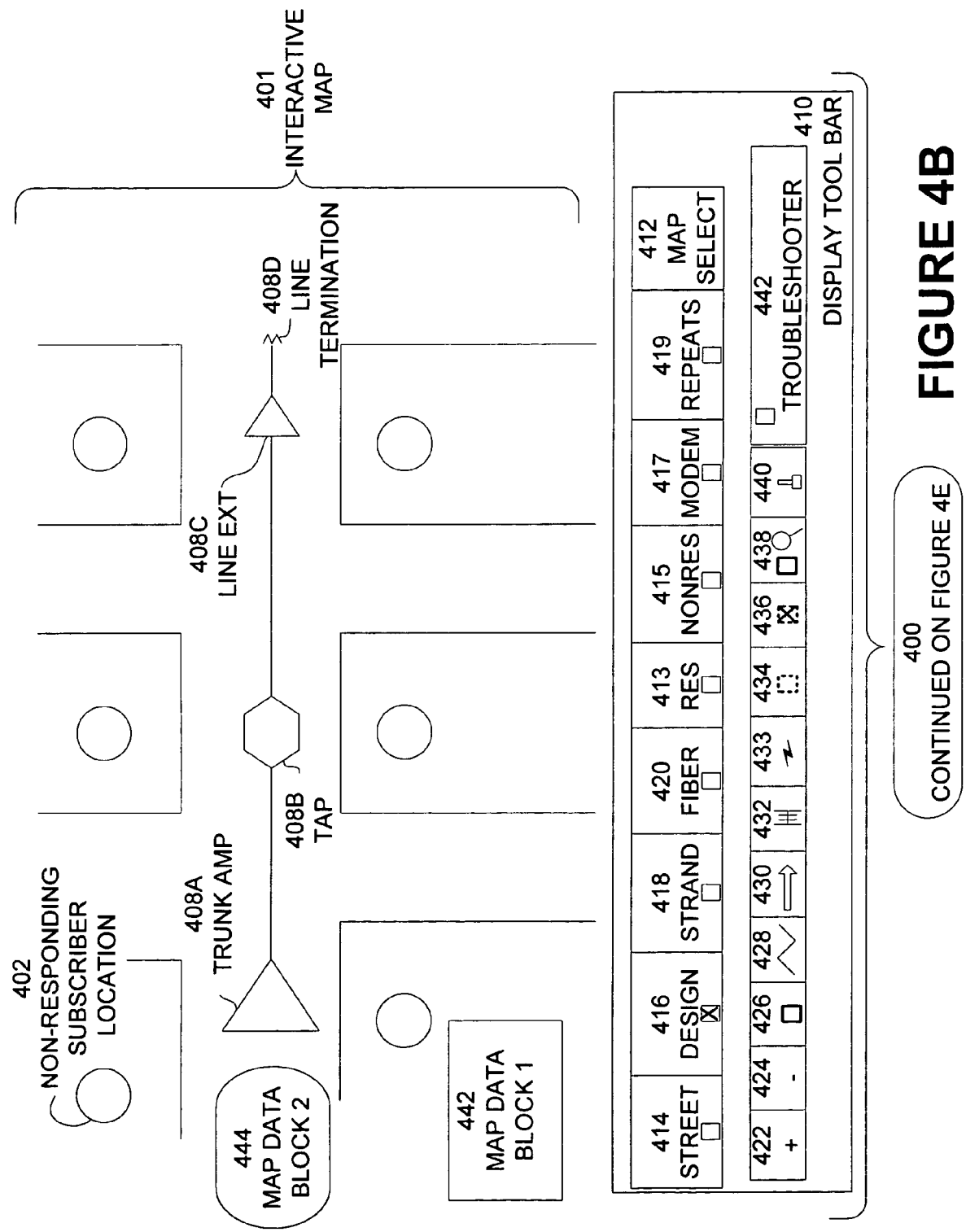

Referring to FIG. 4B, the design layer view 416 is displayed on interactive map 401. In this view, only the design layer view 416 has been selected. In this view, the network devices 408A-408D of the HFC cable network are illustrated relative to a street map of a selected location. FIG. 4B illustrates a trunk amplifier 408A, a tap 408B, a line extender 408C, and a line termination 408D. However, the present invention is not so limited. Other devices may be illustrated without departing from the scope of the present invention. Additionally, tap 408B may be represented by different shapes to indicate the number of drops that may be serviced by the tap.

Figure 4C:
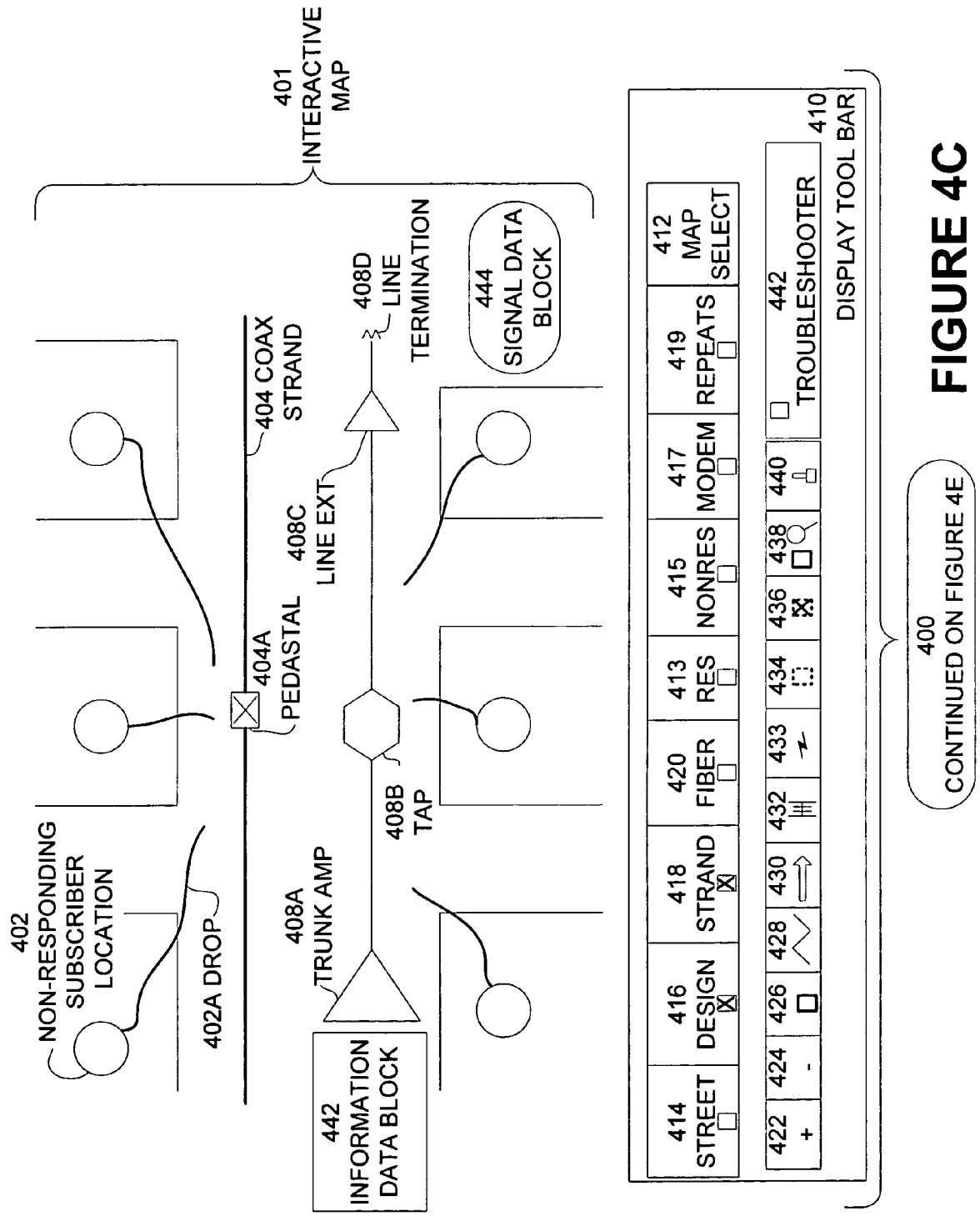

Referring to FIG. 4C, the design layer view 416 and the coax strand view 418 are displayed simultaneously on interactive map 401. In this combined view, both the design layer 416 and the strand layer 418 have been selected. The strand view 418 displays the cable and strand routes, poles, and pedestals. As illustrated, pedestal 404A is served by tap 408B. Non-responding subscriber location 402 is connected to pedestal 404A by drop 402A.

Figure 4D:
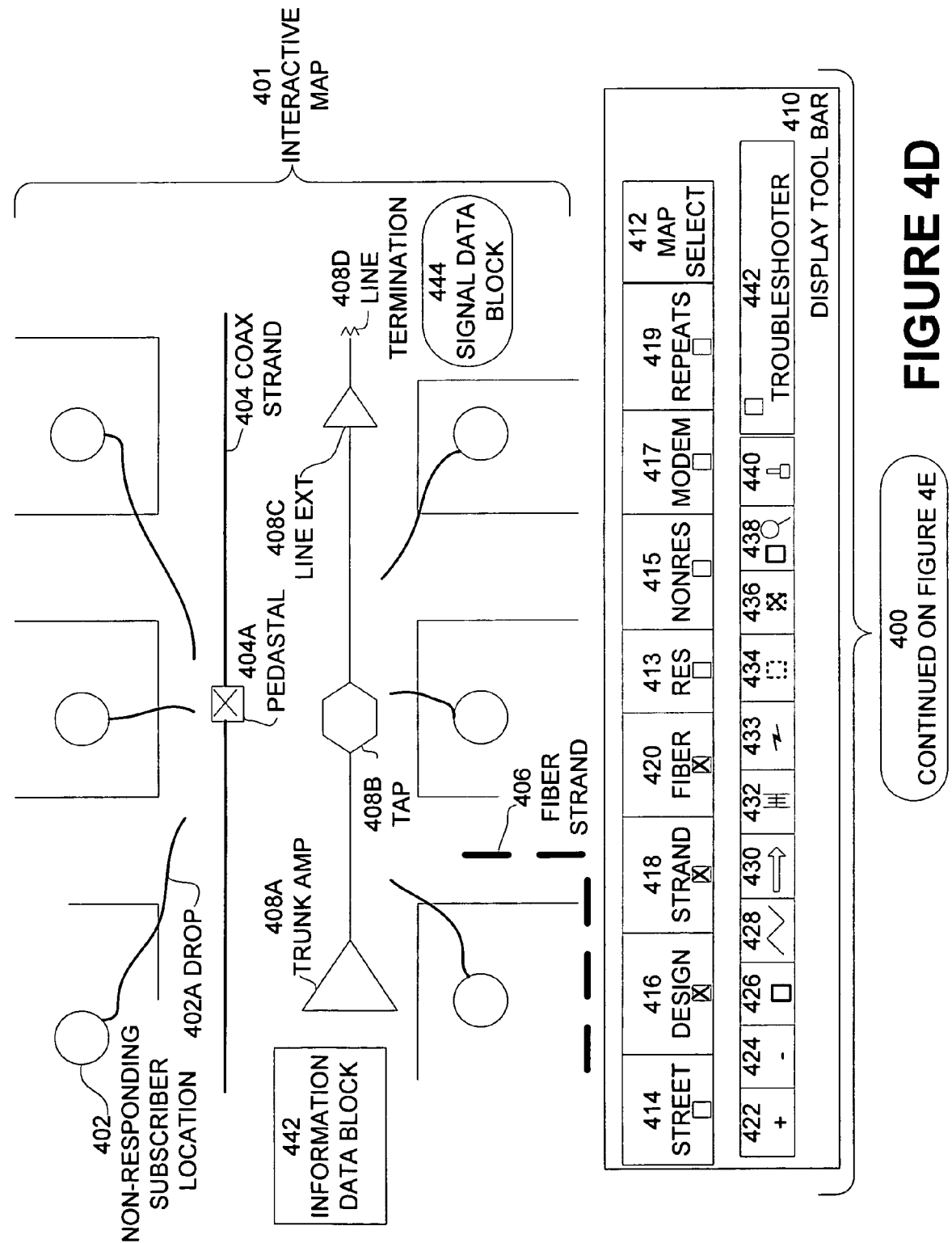

Referring to FIG. 4D, the fiber layer view 420, design layer view 416 and the coax strand layer view 418 are displayed simultaneously on interactive map 401. In this view, the design layer view 416, the strand layer view 418 and the fiber layer view 420 have been selected. The fiber layer view 420 displays the routing of the optical fiber of the HFC cable network.

Display toolbar 410 further comprises "tools" that permit a user to interact with interactive map 401.

The "+" tool 422 increases the magnification (zooms in) of the current view of interactive map 401.

The "−" tool 424 decreases the magnification of the current view (zooms out) of interactive map 401.

The "rectangle" tool 426 indicates a new area to be viewed by dragging a rectangle around an area of the current view of interactive map 401.

The "graph symbol" tool 428 adjusts the magnification of a view of interactive map 401 so that all elements are visible.

The "arrow" tool 430 allows moving to and viewing another part of the currently displayed image on interactive map 401 by pointing then dragging on the current image.

The "ruler" tool 432 permits measuring the distance between two selected points on interactive map 401.

The "flash" tool 433 adds a flashing graphical attribute to the graphical attribute of selected non-responding subscriber locations.

The "dotted line rectangle" tool 434 is the freehand drawing tool that allows the selection of a cluster of non-responding subscriber devices by drawing a circle around them.

The "X'd out rectangle" tool 436 is a de-selection tool that is used to "de-select" previously selected non-responding subscriber devices.

The "rectangle and magnifying glass" tool 438 zooms the view to the previously selected non-responding subscriber devices.

The "paintbrush" tool 440 repaints or updates the current view on interactive map 401.

Referring again to FIG. 4A, according to an embodiment of the present invention, non-responding subscriber location 402 is assigned a non-responder graphical attribute. According to an embodiment of the present invention, the non-responder graphical attribute assigned to a non-responding subscriber location 402 is a display color.

When selected, rectangular selection tool 426 allows a user to define a rectangular area on map 401 using a user input device (not illustrated). According to an embodiment of the present invention, the user input device is a mouse. However, the present invention is not so limited. A suitable user input device may be used without departing from the scope of the present invention. By way of illustration and not as limitation, the user input device may be a drawing pad or a touch sensitive screen.

As previously described, the dotted line rectangle tool 434 is a freehand drawing tool that allows the selection of a cluster of non-responding subscriber devices by drawing a circle around them. According to an embodiment of the present invention, when an area on map 401 is defined using the dotted line rectangle tool 434, a non-responding subscriber location 402 within that defined area is assigned a "selected" graphical attribute to distinguish the included non-responding subscriber locations from those non-responding subscriber locations that are outside the area defined by the dotted line rectangle tool 434. By way of illustration and not as a limitation, a non-responding subscriber location 402 is assigned a display color of red. When selected by the dotted line rectangle tool 434, non-responding subscriber location 402 is assigned a display color of blue.

Referring to FIG. 4E, display blocks 450, 455, 460, and 465 are illustrated. Create ticket information block 450 comprises label value pairs (LVPs) ticket, ticket date, dispatcher, technician, status, and comments. According to an embodiment of the present invention, the action object block 455 comprises the action objects create, save, and send e-mail. When an area on map 401 is defined using the dotted line rectangle tool 434, a user may select an action object from action object block 455. When the user selects the create action object block, the LVPs in create ticket information block 450 are assigned values based on the non-responding subscriber locations 402 included within the selected area defined by dotted line rectangle tool 434. The object, ticket, is assigned a value indicative of a trouble ticket identifier that is associated with a record comprising information about the non-responding subscriber locations included within the within the selected area defined by dotted line rectangle tool 434. The value, ticket date, is assigned a value of the date on which the trouble ticket was created. The value, dispatcher, is assigned a name of a technician who is assigned to work the trouble ticket. The value, technician, is assigned a name of a technician who is assigned to work the trouble ticket. The value, status, is assigned a status of the trouble ticket. According to an embodiment of the present invention, the status value is either "open" or "resolved." The label, comments, is assigned a value indicative of an optional text message added by the user.

When a user selects the save object from action object block 455, the information associated with the created trouble ticket is saved to a file. When a user selects the e-mail object from action object block 455, an e-mail client is opened to permit the information associated with the created trouble ticket to be sent to another party for viewing.

Active trouble tickets block 460 displays data relating to the active trouble tickets associated with the subscriber locations included within the boundary of the map selected using map selection drop down list 412. When non-responding subscriber locations are selected using the dotted line rectangle tool 434, active trouble tickets block 460 displays data relating to the active trouble tickets associated with the selected subscriber locations. Active trouble ticket block 460 comprises LVPs Control Icon, Ticket #, Status, Date, Hub, Dispatcher, Technician, and Comments.

The label, Ticket #, is assigned a value indicative of a trouble ticket number that is associated with a record.

According to an embodiment of the present invention, the label, Control Icon, is associated with three linked control objects. In this embodiment, linked control object 1 opens a ticket display view that presents detailed information regarding the trouble ticket represented by the value of the Ticket # label. Linked control object 2 deletes the trouble ticket represented by the value of the Ticket # label. Linked control object 3 opens an e-mail client to permit the trouble ticket record to be sent to another party for viewing.

The value, Status, is assigned a status of the trouble ticket. According to an embodiment of the present invention, the status value is either "open" or "resolved."

The value, ticket date, is assigned a value of the date on which the trouble ticket was created.

The value, Hub, is assigned a value indicative of the hub number to which the indicated device is physically connected.

The value, Dispatcher, is assigned a name of a dispatcher who is responsible for the status of the trouble ticket.

The value, Technician, is assigned a name of a technician who is assigned to work the trouble ticket.

The label, Comments, is assigned a value indicative of an optional text message added by the user.

Non-responders block 465 displays data relating to non-responding CPE associated with the subscriber locations included within a rectangular selected area defined by the rectangular selection tool 426. Non-responders block 465 comprises LVPs Hub, Acct #, Address, City, MAC Address, Node, CAS, PS, TA and LE.

The label, Hub, is assigned a value indicative of the hub number to which the indicated device is physically connected.

The label, Acct #, is assigned a value indicative of the subscriber account number.

The label, Address, is assigned a value that is indicative of the physical street address where the indicated device is located.

The label, City, is assigned a value indicative of the city where the indicated device is located.

The label, MAC Address, is assigned a value indicative of the actual Media Access Control address of a CPE unit associated with the subscriber location that is determined to be "non-responding." According to an embodiment of the present invention, a location may have one or more non-responding CPE units. In this situation, the non-responding subscriber location would have multiple entries in non-responders block 465.

The label, Node, is assigned a value indicative of the physical optical node to which the indicated device is physically connected.

The label, CAS, is assigned a value indicative of the physical cascade count (sequential number of devices counting from its associated optical node which is the originating point of a cascade).

The label, PS, is assigned a value indicative of the power supply that powers the indicated device.

The label, TA, is assigned a value indicative of the actual trunk amplifier number that supports the indicated device.

The label LE is assigned a value indicative of the actual line extender number that supports the indicated device.

In an embodiment of the present invention, data blocks 450, 455, 460, and 465 are linked to interactive display 400. Upon selection of an interactive map 401 via map selection drop down menu 412, active trouble tickets data block 460 comprises a list of the active trouble tickets for the area represented by the selected interactive map. Additionally, non-responders data block 465 comprises a list of non-responding devices associated with non-responding subscriber locations within the area defined by the selected interactive map.

When non-responding locations are selected using the dotted line rectangle tool 434, the selected non-responding locations are displayed on interactive map 401 using a selected graphical attribute. Active trouble tickets data block 460 comprises a list of the active trouble tickets associated with the selected non-responding subscriber locations. Additionally, non-responders data block 465 comprises a list of non-responding devices associated with the selected non-responding subscriber locations.

As previously described, a trouble ticket may be created for a group of selected non-responding subscriber locations. The selected non-responding subscriber locations that are associated with a trouble ticket are associated with a "ticket" graphical attribute. By way of illustration and not as limitation, the default non-responding graphical attribute of a non-responding subscriber location is a display color of red. When selected, the default graphical attribute is replaced with a selection graphical attribute comprising a display color of blue. When the non-responding subscriber location is associated with a trouble ticket, its graphical attribute is replaced with a "ticket" graphical attribute comprising a display color of yellow.

A user may also select a trouble ticket from active trouble tickets data block 460 for display on ticket screen 252. When a trouble ticket is selected, the non-responding subscriber locations associated with that ticket are displayed on the appropriate interactive map 401 using the ticket graphical attribute.

When non-responding subscriber locations associated with a trouble ticket are displayed on interactive map 401 using the design layer view 416, additional information is displayed regarding the network devices that serve the affected non-responding subscriber locations. Referring again to FIG. 4B, descriptive data block 442 and signal data block 444 are displayed. According to an embodiment of the present invention, descriptive data block 442 comprises descriptive information regarding the most proximate active device displayed on interactive map 401. As illustrated in FIG. 4B, descriptive data block 442 provides descriptive information relating to trunk amplifier 408A. A descriptive data block comprising descriptive information for line extender 408C has been omitted for clarity.

According to an embodiment of the present invention, descriptive data block 442 comprises data indicative of a device identifier, a device type, input signal levels at a selected high, medium, and low frequency, output signals of at the selected high, medium, and low frequency, pad information, and network location information relative to other active devices within the coax strand 404.

According to an embodiment of the present invention, signal data block 444 comprises input signals of the selected high, medium and low frequencies measured at line termination 408D.

FIG. 5 illustrates a block diagram of a process for identifying common faults among selected non-responding subscriber locations according to an embodiment of the present invention.

Referring to FIG. 5, a determination is made whether selected non-responding subscriber locations share a common node 500. If the selected non-responding subscriber locations do not share a common node, the problem is deemed isolated to the individual selected non-responding subscriber locations 505.

If the selected non-responding subscriber locations share a common node, a determination is made whether the selected non-responding subscriber locations share a common trunk amplifier 510. If the selected non-responding subscriber locations do not share a common trunk amplifier, troubleshooting is directed to the common node 515. If the selected non-responding subscriber locations share a common trunk amplifier, a determination is made whether the selected non-responding subscriber locations share a common line extender 520.

If the selected non-responding subscriber locations do not share a common line extender, troubleshooting is directed to the common trunk amplifier 525. If the selected non-responding subscriber locations share a common line extender, a determination is made whether the selected non-responding subscriber locations share a common splitter 530.

If the selected non-responding subscriber locations do not share a common splitter, troubleshooting is directed to the common line extender 535. If the selected non-responding subscriber locations share a common line extender, a determination is made whether the selected non-responding subscriber locations share a common line tap 540.

If the selected non-responding subscriber locations do not share a common line tap, troubleshooting is directed to the common line splitter 545. If the selected non-responding subscriber locations share a common line tap, troubleshooting is directed to the common line tap 550.

According to an embodiment of the present invention, a group of non-responding subscriber locations is selected using the dotted line rectangle tool (see, FIG. 4D, 434). The technician selects the troubleshooting option 442 and the program identifies the design component common to all of the selected non-responding subscriber locations. This component is displayed on the screen in the same color as the selected non-responding subscriber locations. If the technician eliminates the identified component as the problem needing correction, the next most likely device is then displayed.

According to an embodiment of the present invention, the process for identifying common faults among selected non-responding subscriber locations may be extended to include network components beginning at the node and moving upstream (see, FIG. 1). In this embodiment, modem data is used to differentiate the hub components used for video from those used for data. Additionally, data relating to responding subscriber locations may be incorporated into the analysis to further eliminate and/or identify possible causes of the non-responsiveness of subscriber locations.

A fault location system and method for an HFC cable network and method have been described. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the," is not to be construed as limiting the element to the singular. Moreover, a reference to a specific time, time interval, and instantiation of scripts or code segments is in all respects illustrative and not limiting.

What is claimed is:

1. A method of locating a fault in a hybrid fiber coax (HFC) cable network, wherein the HFC cable network comprises customer premises equipment (CPE) units and network components, and the method comprises:

defining boundaries of a geographic region, wherein the geographic region contains the HFC cable network;

assigning geographical information elements of the geographic region to graphical information layers, wherein the layers are independently selectable and displayable;

configuring a processor to create a network component display object for each network component, wherein the network component display object comprises network component graphical attributes and wherein the network component display object is associated with network component status information and network component identifying information;

configuring the processor to create a CPE display object for each CPE unit, wherein the CPE display object comprises CPE graphical attributes and wherein the CPE display object is associated with CPE status information and CPE identifying information;

configuring the processor to assign each network component display object to a network layer, wherein the network layer is independently selectable and displayable and wherein the network layer is scaled to overlay the selected geographic region and to map each network component display object to a component location according to its network component identifying information;

configuring the processor to assign each CPE display object to a CPE layer, wherein the CPE layer is independently selectable and displayable and wherein the CPE layer is scaled to overlay the selected geographic region and to map each CPE display object to a CPE location according to its CPE identifying information;

configuring the processor to display an interactive map, wherein the interactive map comprises at least one graphical information layer, at least one network layer and at least one CPE layer;

configuring the processor to identify one or more CPE units as "non-responding," wherein a CPE is non-responding when an upstream signal from the CPE unit cannot be detected;

configuring the processor to associate a non-responder attribute with the CPE display object associated with each of the one or more non-responding CPE units;

configuring the processor to define a first closed area of the interactive map comprising the one or more non-responding CPE units;

configuring the processor to identify a first network component related to the one or more non-responding CPE units within the first closed area;

configuring the processor to determine whether the first network component is a likely cause of the non-responsiveness of the one or more non-responsive CPE units within the first closed area; and configuring the processor to assign a graphical attribute to the first network component indicative of a failure of the first network component and to display the graphical attribute at the location of the first network component when the first network component is the likely cause of the non-responsiveness of the one more non-responsive CPE units within the closed area.

2. The method of claim 1, wherein CPE identifying information comprises one or more data elements selected from the group consisting of a subscriber address, a CPE MAC address, a CPE serial number, a CPE part number, a CPE release number, a CPE manufacturer identifier, and a subscriber number.

3. The method of claim 1, wherein determining that an upstream signal from a CPE unit cannot be detected is performed before a complaint is received from a subscriber associated with the non-responding CPE unit.

4. The method of claim 1, wherein determining that an upstream signal from a CPE unit cannot be detected is performed at a headend of the HFC cable network.

5. The method of claim 1, wherein the non-responder attribute is selected from the group consisting of a color, a shape, a blinking graphic, and an audible warning.

6. The method of claim 1, wherein configuring the processor to define a first closed area of the interactive map comprising the one or more non-responding CPE units comprises configuring the processor to define a first selection area on the interactive map in response to a shaped selection tool.

7. The method of claim 1, wherein configuring the processor to define a first closed area of the interactive map comprising the one or more non-responding CPE units comprises configuring the processor to define a first selection area on the interactive map in response to a freehand selection tool.

8. The method of claim 1, wherein the method further comprises:
configuring the processor to define a second closed area of the interactive map comprising at least one of the one or more non-responding CPE units; and
configuring the processor to exclude the at least one of the one or more non-responding CPE units from the first closed area.

9. The method of claim 8, wherein configuring the processor to define a second closed area of the interactive map comprising at least one of the one or more non-responding CPE units comprises configuring the processor to define a second closed area of the interactive map comprising at least one of the one or more non-responding CPE units in response to a shaped selection tool.

10. The method of claim 8, wherein configuring the processor to define a second closed area of the interactive map comprising at least one of the one or more non-responding CPE units comprises configuring the processor to define a second closed area of the interactive map comprising at least one of the one or more non-responding CPE units in response to a freehand selection tool.

11. The method of claim 1, wherein the method further comprises configuring the processor to display the status information and the identifying information of network component and each CPE unit within the first closed area.

12. The method of claim 1 further comprising configuring the processor to assign each of the one or more non-responding CPE units to a trouble ticket.

13. The method of claim 12 further comprising configuring the processor to associate a trouble ticket attribute with the CPE display object associated with each of the one or more non-responding CPE unit.

14. The method of claim 13, wherein the trouble ticket attribute is selected from the group consisting of a color, a shape, a blinking graphic, and an audible warning.

15. The method of claim 1 further comprising configuring the processor to:
determine whether each of the one or more non-responding CPE units is assigned to a current trouble ticket; and
when a non-responding CPE unit is not assigned to a current trouble ticket, then assigning that non-responding CPE unit to a new trouble ticket.

16. The method of claim 1 further comprising configuring the processor to:
display a list of trouble tickets;
select a trouble ticket from the list; and
display the CPE display object of each CPE unit associated with the selected trouble ticket on the interactive map.

17. The method of claim 1, wherein the CPE identifying information comprises a trouble history of a CPE unit and wherein configuring the processor to determine whether the first network component is a likely cause of the non-responsiveness of the one or more non-responsive CPE units within the closed area comprises configuring the processor to:
- determine from the identifying information the status information of the network components and the CPE units related to the one or more non-responding CPE units and a trouble history of at least one of the one or more the non-responding CPE units a location of a failed network component that is a likely cause of the non-responsiveness of the one or more non-responsive CPE units; and
- determine whether the location of the failed network component that is a likely cause of the non-responsiveness of the one or more non-responsive CPE units is the location of the first network component.

18. The method of claim 1, wherein configuring the processor to assign each network component display object to a network layer comprises configuring the processor to assign network design display objects to a design layer, network strand display objects to a strand layer and network fiber display objects to a fiber layer.

19. The method of claim 1 further comprising configuring the processor to determine a distance between a selected network component display object or a selected CPE display object and a selected location.

20. The method of claim 1, wherein the CPE unit is a video termination device.

21. The method of claim 20, wherein the video termination device is selected from the group consisting of a set top box, an OpenCable-compliant standalone device, and a consumer device integrated with an OpenCable-compliant device.

22. The method of claim 1, wherein the CPE unit is selected from the group consisting of a cable modem and a media terminal adapter.

23. A fault location system for a hybrid fiber coax (HFC) cable network, wherein the HFC cable network comprises CPE units and network components and wherein the system comprises:
- a datastore, wherein the datastore is configured with software executable instructions to cause the datastore to perform operations comprising:
  - receiving identifying information of each CPE unit, wherein the identifying information comprises a street address of a subscriber associated with the CPE unit; and
  - receiving status information of each CPE unit, wherein the status information comprises a "responding" state indicative of a CPE unit for which an upstream signal has been detected and a non-responder state indicative of a CPE unit for which an upstream signal has not been detected;
- an interactive map, wherein the interactive map comprises:
  - boundaries of a geographic region, wherein the geographic region contains the HFC cable network;
  - geographical information layers, wherein each graphical information layer comprises graphical information elements of the geographic region;
  - network layers, wherein the network layer comprises selected network component display objects and wherein the network layer is scaled to overlay the selected geographic region and to map each network component display object to a component location according to its network component identifying information; and
  - CPE layers, wherein the CPE layer comprises selected CPE display objects and wherein the CPE layer is scaled to overlay the selected geographic region and to map each CPE display object to a CPE location according to its CPE identifying information, and
  - wherein the graphical information layers, the network component layers and the CPE layers are each individually and independently selectable and displayable; and
- a processor, wherein the processor is configured with software executable instructions to cause the processor to perform operations comprising:
  - displaying the interactive map;
  - creating a network component display object for each network component, wherein the network component display object comprises network component graphical attributes and wherein the network component display object is associated with network component status information and network component identifying information;
  - creating a CPE display object for each CPE unit, wherein the CPE display object comprises CPE graphical attributes and wherein the CPE display object is associated with CPE status information and CPE identifying information;
  - assigning each network component display object to a network layer, wherein the network layer is independently selectable and displayable and wherein the network layer is scaled to overlay the selected geographic region and to map each network component display object to a component location according to its network component identifying information;
  - assigning each CPE display object to a CPE layer, wherein the CPE layer is independently selectable and displayable and wherein the CPE layer is scaled to overlay the selected geographic region and to map each CPE display object to a CPE location according to its CPE identifying information;
  - identifying one or more CPE units as "non-responding," wherein a CPE is non-responding when an upstream signal from the CPE unit cannot be detected;
  - associating a non-responder attribute with the CPE display object associated with each of the one or more non-responding CPE units;
  - defining a first closed area of the interactive map comprising the one or more non-responding CPE units;
  - identifying a first network component related to the one or more non-responding CPE units within the first closed area;
  - determining whether the first network component is a likely cause of the non-responsiveness of the one more non-responsive CPE units within the first closed area; and
  - assigning a graphical attribute to the first network component indicative of a failure of the first network component and to display the graphical attribute at the location of the first network component when the first network component is the likely cause of the non-responsiveness of the one or more non-responsive CPE units within the closed area.

24. The system of claim 23, wherein identifying information further comprises one or more data elements selected from the group consisting of a CPE unit MAC address, a CPE unit serial number, a CPE unit part number, a CPE unit release number, a CPE unit manufacturer identifier, and a subscriber number.

25. The system of claim 24, wherein the status information of a non-responder CPE unit is received before a complaint is received from a subscriber associated with the non-responder CPE unit.

26. The system of claim 23, wherein the HFC cable network further comprises a headend and wherein the headend comprises instruction to permit the headend to determine the status information of the CPE unit.

27. The system of claim 23, wherein the non-responder attribute is selected from the group consisting of a color, a shape, a blinking graphic, and an audible warning.

28. The system of claim 23, wherein the processor is responsive to a user input and wherein the user input comprises a shaped selection tool.

29. The system of claim 23, wherein the processor is responsive to a user input and wherein the user input comprises a freehand selection tool.

30. The system of claim 23, wherein the processor is further configured with software executable instructions to cause the processor to perform operations comprising:
 defining a second closed area of the interactive map comprising at least one of the one or more non-responding CPE units; and
 excluding the at least one of the one or more non-responding CPE units from the first closed area.

31. The system of claim 30, wherein the processor is responsive to a user input and wherein the user input comprises a shaped selection tool.

32. The system of claim 30, wherein the processor is responsive to a user input and wherein the user input comprises a freehand selection tool.

33. The system of claim 23, wherein the processor is further configured with software executable instructions to cause the processor to perform operations comprising displaying the status information and the identifying information of the network component and each CPE unit within the first closed area.

34. The system of claim 23, wherein the processor is further configured with software executable instructions to cause the processor to perform operations comprising associating a trouble ticket attribute with the CPE display object associated with each of the one or more non-responding CPE units.

35. The system of claim 34, wherein the trouble ticket attribute is selected from the group consisting of a color, a shape, a blinking graphic, and an audible warning.

36. The system of claim 23, wherein the processor is further configured with software executable instructions to cause the processor to perform operations comprising:
 displaying a list of trouble tickets; and
 in response to the selection of a trouble ticket from the list, displaying the CPE object of each CPE unit associated with the selected trouble ticket on the interactive map.

37. The system of claim 23, wherein the fault isolation server is further configured with software executable instructions to cause the processor to perform operations comprising:
 associating the identifying information of the CPE unit with a trouble history of the CPE unit; and
 determining from the identifying information the status information of the network components and the CPE units related to the non-responding CPE unit and a trouble history of the non-responding CPE unit a location of a failed network component that is a likely cause of the non-responsiveness of the non-responsive CPE unit.

38. The system of claim 23, wherein the network layer is selected from the group consisting of a design layer, a strand layer, and a fiber layer.

39. The system of claim 23, wherein the processor is further configured with software executable instructions to cause the processor to perform operations comprising determining a distance between a selected network component display object or a selected CPE display object and a selected location.

40. The system of claim 23, wherein the CPE unit is a video termination device.

41. The system of claim 40, wherein the video termination device is selected from the group consisting of a set top box, an OpenCable-compliant standalone device, and a CPE unit integrated with an OpenCable-compliant device.

42. The system of claim 23, wherein the CPE unit is selected from the group consisting of a cable modem and a media terminal adapter.

43. The system of claim 23, wherein the processor is further configured with software executable instructions to cause the processor to perform operations comprising:
 determining whether each of the one or more non-responding CPE units is assigned to a current trouble ticket; and
 when a non-responding CPE unit is not assigned to a current trouble ticket, then assigning that non-responding CPE unit to a new trouble ticket.

* * * * *